United States Patent
Ko

(10) Patent No.: US 10,830,480 B2
(45) Date of Patent: Nov. 10, 2020

(54) SYSTEM AND METHOD OF SINGLE-ZONE DUCT CONTROL

(71) Applicant: Komfort IQ, Inc., Los Angeles, CA (US)

(72) Inventor: John Ko, Los Angeles, CA (US)

(73) Assignee: Komfort IQ, Inc., Los Angeles, CA (US)

( * ) Notice: Subject to any disclaimer, the term of this patent is extended or adjusted under 35 U.S.C. 154(b) by 0 days.

(21) Appl. No.: 16/127,544

(22) Filed: Sep. 11, 2018

(65) Prior Publication Data

US 2020/0080745 A1 Mar. 12, 2020

(51) Int. Cl.
| | | |
|---|---|---|
| *F24F 11/64* | (2018.01) | |
| *G05B 19/042* | (2006.01) | |
| *F24F 11/74* | (2018.01) | |
| *F24F 120/10* | (2018.01) | |
| *F24F 110/10* | (2018.01) | |

(52) U.S. Cl.
CPC .............. *F24F 11/64* (2018.01); *F24F 11/74* (2018.01); *G05B 19/042* (2013.01); *F24F 2110/10* (2018.01); *F24F 2120/10* (2018.01); *G05B 2219/2614* (2013.01)

(58) Field of Classification Search
CPC ........ F24F 11/64; F24F 11/74; F24F 2110/10; F24F 2120/10; G05B 19/042; G05B 2219/2614
See application file for complete search history.

(56) References Cited

U.S. PATENT DOCUMENTS

| | | | |
|---|---|---|---|
| 3,826,963 A | 7/1974 | Lorenz | |
| RE30,936 E * | 5/1982 | Kmetz | .................... F23N 5/245 431/22 |
| 4,646,964 A | 3/1987 | Parker | |
| 4,969,508 A | 11/1990 | Tate | |
| 5,489,827 A | 2/1996 | Xia | |
| 5,764,146 A | 6/1998 | Baldwin | |
| 6,386,281 B1 | 5/2002 | Ganesh | |
| 6,909,921 B1 | 6/2005 | Bilger | |
| 6,981,915 B2 * | 1/2006 | Moore | .................... F24F 13/12 454/184 |
| 7,104,082 B1 | 9/2006 | Moratalla | |
| 7,541,924 B2 | 6/2009 | Elwell | |
| 8,571,518 B2 | 10/2013 | Imes | |

(Continued)

OTHER PUBLICATIONS

Office Action dated May 13, 2020 for U.S. Appl. No. 16/040,579 (pp. 1-20).

*Primary Examiner* — Ramesh B Patel
(74) *Attorney, Agent, or Firm* — Riverside Law LLP

(57) ABSTRACT

A system for controlling airflow into a single room includes a duct having a controllable damper, fluidly connected to the room, a controller connected to the damper, configured to open and close the damper, at least one sensor communicatively connected to the controller, positioned in the room and configured to measure a parameter in the room, at least one portable computing device communicatively connected to the sensor and the controller, and control logic stored as instructions on a non-transitory computer readable medium, the instructions configured to open and close the damper in response to a measurement received from the at least one sensor. A method for controlling a damper in a duct fluidly connected to a room is also described.

19 Claims, 3 Drawing Sheets

(56) References Cited

U.S. PATENT DOCUMENTS

| | | |
|---|---|---|
| 9,103,555 B2 | 8/2015 | Zou |
| 9,244,470 B2 | 1/2016 | Steinberg |
| 9,709,294 B2 * | 7/2017 | Elliott .................... F24F 11/30 |
| 9,723,762 B1 * | 8/2017 | Ross ...................... F24F 13/222 |
| 9,874,370 B2 | 1/2018 | Uselton |
| 9,982,903 B1 * | 5/2018 | Ridder .................... F24F 11/30 |
| 10,088,821 B2 * | 10/2018 | Karamanos .......... G05D 7/0635 |
| 10,190,794 B1 | 1/2019 | Zelczer |
| 10,371,399 B1 * | 8/2019 | Rodriguez .............. F24F 11/62 |
| 2004/0224627 A1 | 11/2004 | Becelaere |
| 2005/0087614 A1 | 4/2005 | Ruise |
| 2011/0253796 A1 | 10/2011 | Posa |
| 2014/0075977 A1 * | 3/2014 | Elliott .................... F24F 3/1405 |
| | | 62/176.1 |
| 2014/0260692 A1 | 9/2014 | Sharp |
| 2014/0277773 A1 * | 9/2014 | Goldschmidt ...... G01F 25/0007 |
| | | 700/282 |
| 2015/0369503 A1 | 12/2015 | Flaherty |
| 2015/0370927 A1 * | 12/2015 | Flaherty ................ F24F 11/62 |
| | | 703/1 |
| 2017/0307244 A1 * | 10/2017 | Elliot ..................... F24F 11/30 |
| 2019/0145642 A1 * | 5/2019 | Heigl .................. F24F 11/0001 |
| | | 454/239 |

\* cited by examiner

SYSTEM AND METHOD OF SINGLE-ZONE DUCT CONTROL

BACKGROUND OF THE INVENTION

Currently available Heating, Ventilation, and Air Conditioning (HVAC) systems broadly fall into two categories. Smaller residential systems consist of a single "zone," which has a heating system, an air conditioning system, and a thermostat. The thermostat measures the temperature at a single point in the residence, sometimes near the air intake for any recirculating ventilation system, and compares that temperature to a threshold or set of thresholds. If the temperature falls below a minimum threshold, the HVAC system will turn on the heater to warm the residence. If the temperature rises above a maximum threshold, the HVAC system will turn on the air conditioner to cool it.

A second category combines multiple such systems within a larger residential or commercial structure, partitioning the structure into "zones." For example, an office building might be divided into four zones, each with its own thermostat, heater, and air conditioner. In this example, each zone will act like its own, closed, thermostatically-controlled system, with three settings (heat, cool, or do nothing) and one measurement point (the thermostat). Zones can vary widely in size, from fifty square feet to thousands of square feet.

These existing systems have numerous disadvantages. For example, even in the most granular commercial or residential structure, airflow to multiple rooms or offices is typically turned on and off at the same time based on a single sensor, or in some cases based on temperatures measured at a few sensors positioned at different points in the structure. Individual rooms or offices are restricted by centrally-determined temperature thresholds, or the whim of the occupant of the office in which the thermostat is located. Furthermore, control of such systems is limited to thermostats or a central control interface. There is no way for individual occupants of a house or office to exercise control over the temperature of their office or rooms.

Thus, there is a need in the art for a more granular system of air circulation and climate control, with intelligent sensors and actuators to increase efficiency and overall comfort. The present invention satisfies that need.

SUMMARY OF THE INVENTION

In one aspect, a system for controlling airflow into a single room comprises a duct having a controllable damper, fluidly connected to the room, a controller connected to the damper, configured to open and close the damper, at least one sensor communicatively connected to the controller, positioned in the room and configured to measure a parameter in the room, at least one portable computing device communicatively connected to the sensor and the controller; and control logic stored as instructions on a non-transitory computer readable medium, the instructions configured to open and close the damper in response to a measurement received from the at least one sensor. In one embodiment, the at least one sensor comprises a temperature sensor. In one embodiment, the at least one sensor comprises a motion sensor. In one embodiment, the at least one sensor is disposed within a wall plate cover. In one embodiment, the at least one sensor is disposed within a light fixture. In one embodiment, the at least one sensor is disposed within a smoke detector. In one embodiment, the portable computing device is a smartphone.

In one embodiment, the non-transitory computer-readable medium containing the control logic is disposed within the smartphone. In one embodiment, the control logic comprises an interface for manual control of the damper. In one embodiment, the smartphone is configured to pair with the at least one sensor when placed near the at least one sensor. In one embodiment, the at least one sensor comprises one sensor electrically connected to the smartphone. In one embodiment, the at least one portable computing device comprises two portable computing devices. In one embodiment, the at least one sensor and the non-transitory computer-readable medium containing the control logic are disposed within a sensor assembly. In one embodiment, the sensor assembly further comprises at least one control element selected from the group consisting of a button, dial, switch, and touchscreen.

In another aspect, a method of controlling a damper in a duct fluidly connected to a room comprises measuring at least one parameter from at least one sensor positioned in the room, determining a damper action based on the at least one parameter, and actuating the damper in accordance with the determined damper action. In one embodiment, the method further comprises the steps of receiving an instruction from a user via a portable electronic device and modifying the damper action based on the instruction from the user. In one embodiment, the portable electronic device is a smartphone. In one embodiment, the at least one sensor is electrically connected to the smartphone. In one embodiment, the instruction is an instruction to open or close the damper. In one embodiment, the at least one sensor is a temperature sensor, the at least one parameter is a temperature measurement, and the method further comprises the step of comparing the temperature measurement to a temperature threshold.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, and in which.

DETAILED DESCRIPTION

Figure 1:
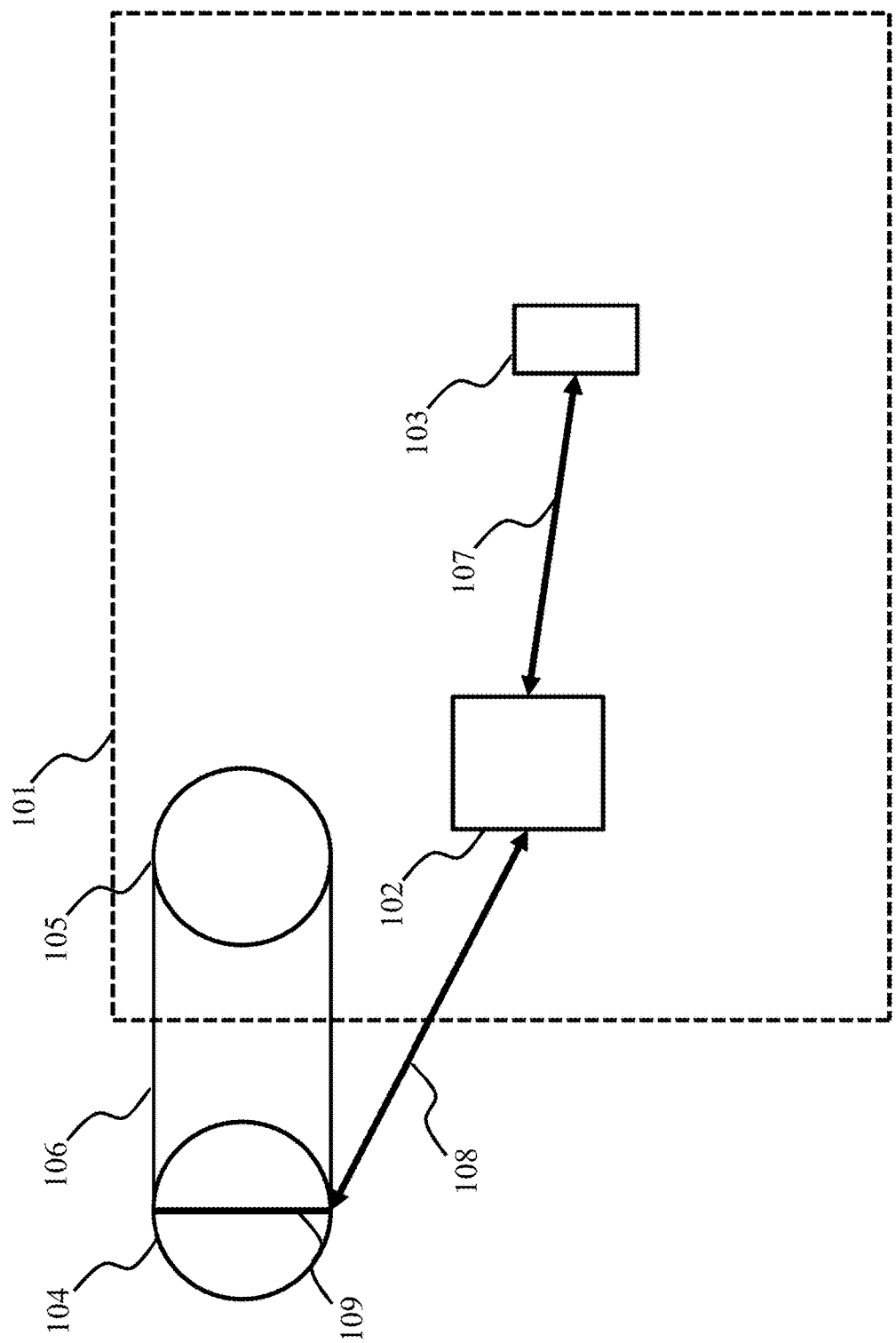
FIG. 1 is a schematic of a system of the present invention.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C #, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE), Bluetooth Mesh, Bluetooth Low Energy Mesh, Bluetooth Beacon, Zigbee®, or Z-wave communication links, or any other method by which one electronic device is capable of communicating with another. In some embodiments, elements of the networked portion of the invention may be implemented over a Virtual Private Network (VPN).

Parts of this application may refer to a "MicroZone System" or "MicroZone." As used herein, a "MicroZone" is a system where airflow into each space in a HVAC zone can be independently controlled without the need for additional HVAC controllers. More information about and exemplary embodiments of MicroZones may be found in U.S. patent application Ser. No. 16/040,579, filed on Jul. 20, 2018, the entire contents of which is incorporated herein by reference.

Parts of this application may refer to a "smart duct." As used herein, a "smart duct" is a duct or portion of a duct that includes an attached actuator and one or more dampers that are moved by the actuator to control airflow. More information about and exemplary embodiments of smart ducts may be found in U.S. patent application Ser. No. 16/040,573, the entire contents of which is incorporated herein by reference.

With reference now to FIG. 1, a diagram of one exemplary embodiment of the present invention is shown. A room 101 includes a sensor assembly 102 and an air vent (inlet or outlet) 105. Although in the depicted embodiment a single air vent is shown, it is understood that in certain embodiments of the invention a single system in a room may comprise multiple air vents, controlled independently or together. The some or all of the one or more air vents may be fluidly connected to a controllable duct 104 comprising a damper 109. The controllable duct 104 may be a smart duct, or may otherwise have an electrically actuated damper for controlling air flow into or out of the room 101 via vent 105. Control logic may be implemented in one or both of the sensor assembly 102 and the controllable duct 104, and the controllable duct 104 and sensor assembly 102 may be communicatively connected to one another via communication link 108. As would be understood by one skilled in the art, communication link 108 may comprise any wired or wireless data connection. In some embodiments, the communication link 108 is unidirectional, only sending information from the sensor assembly 102 to the controllable duct 104. In other embodiments, the communication link 108 may be bidirectional, sending data in both directions. In some embodiments, multiple sensors or devices of the present invention may be configured to communicate with one another in a mesh network as known in the art, i.e. each device in the network acts as a relay for signals received from any other device in the network, so as to extend the effective communication range of all devices.

A sensor assembly of the present invention may comprise one or more sensors. Examples of sensors include, but are not limited to temperature sensors, motion sensors, smoke sensors, infrared (IR) sensors, photodetectors, gas sensors, sound sensors (e.g. microphones), ranging sensors including ultrasonic or LiDAR, or radio frequency (RF) sensors. A single sensor assembly may contain one or more of the aforementioned sensors, and may in some embodiments include multiple sensors of the same type.

Control logic of the present invention may process data from one or more of these sensors in order to determine a damper action to perform in response to measurements from one or more sensors, or in response to instructions from one or more users. Damper actions include, but are not limited to, opening or closing a damper 109. For example, a temperature sensor may be used to determine if the temperature in room 101 is above a certain threshold, which may cause the control logic to open the damper 109 in order to allow cool air to flow into the room. In another embodiment, a motion sensor in the room 101 may be used to determine whether the room is occupied, allowing for airflow into the room if the room is occupied and closing the damper 109 in order to constrict airflow into the room if it is determined from the motion sensor that the room is not occupied. In some embodiments, a smoke sensor may be used to determine if there is smoke in the room 101, closing the damper 109 in order to constrict airflow into the room, and starve a presumed fire of oxygen. An IR sensor may be used for example either as a presence sensor or as a fire sensor, and control logic may evaluate thermal measurements from the IR sensor for these or any other suitable purpose known in the art. Similarly, a gas sensor may be used to determine the presence or concentration of a given gas in a room. Exemplary gases that may be monitored by a gas sensor of the present invention include, but are not limited to methane (natural gas), carbon monoxide (CO). In some embodiments, a microphone, sound sensor, or range sensor may be used by control logic of the present invention to determine presence in a room. In one embodiment, a Bluetooth Beacon may be used in conjunction with a smartphone or other portable electronic device in order to determine range and position of a user. In some embodiments, an RF sensor may be used to determine whether a user's cell phone or other radio-emitting device is present within room 101, either to determine the presence of a user in the room, the identity of an individual user in the room, or any other use known in the art. In some embodiments, readings from one or more sensors may be used in tandem. For example, a temperature sensor and a presence sensor may be used in concert to open a damper if a temperature is above a set threshold AND the room is determined to be occupied, but to keep the damper closed if one or neither of the two conditions is true.

In some embodiments of the invention the sensor assembly consists of a single housing enclosing all the sensors in the system, while in other embodiments various sensors may be distributed about the room and communicate with one another or back to a central controller via one or more wired or wireless connections. Some or all of the sensors in the sensor assembly may further be integrated into elements already present in the room so as to be unobtrusive. For example, one or more of the sensors of the present invention may be placed in a wall plate cover, for example a light switch cover or electrical outlet cover, within a light fixture, within a ceiling tile, within a smoke detector or CO detector, within or mounted on a desk, chair, lamp, file cabinet, or other furniture, within or connected to a laptop docking station, within a picture frame, or any other suitable location in a room. In some embodiments one or more sensors of a sensor assembly may be discrete, portable sensing elements that can be plugged into a power source, for example plugged into an electrical outlet or a USB port. Sensors of the present invention that are positioned in elements that are powered or adjacent to power sources (for example lamps, light fixtures, or switch/outlet covers) may further draw power from the relevant power sources. For example, a sensor positioned in an outlet cover may include electrical connections to the poles of the outlet so that batteries are not necessary.

In some sensor embodiments, including sensors that have a connection to a power source, a sensor of the present invention may include an independent battery, for example to provide power to the sensor in the event that power is lost, or in order to provide power where no other power source is available. In sensors that include connections to a fixed power source and a battery, the sensor may further include charging circuitry to keep the battery charged when connected to the power source.

Referring again to FIG. 1, in some sensor embodiments, some or all of the sensor measurements used by the system may be obtained from a portable device 103 such as a smart phone carried by a user. In such embodiments, sensor measurements from the smart phone may either be processed and interpreted on the smart phone, or may alternatively be transmitted via a wireless connection 107 to a sensor assembly, base station, controller, or directly to a controller for a damper actuator. Wireless connection 107 may be a direct wireless connection, for example a Bluetooth or BLE connection, or may alternatively connect via a base station or via the Internet, for example via Wi-Fi or one or more cellular networks.

In some embodiments, some or all of the control logic of a system of the present invention may reside on a smartphone or other portable electronic device. In one example, a smartphone is configured to "pair" via Bluetooth, RFID, NFC, or some other wireless protocol with a sensor assembly and/or with one or more discrete sensors, then perform one or more actions or send one or more instructions based on the measurements from the various sensors. Once the portable electronic device is paired with the sensor assembly, in some embodiments various controls will be exposed to the user of the portable electronic device. Controls may include, but are not limited to, manually opening and closing one or more dampers, setting one or more temperature thresholds, enabling or disabling one or more individual sensors, setting system behavior in response to one or more individual sensors, view raw or processed data from one or more individual sensors, etc. Pairing with individual sensors or the sensor assembly may be accomplished for example through a separate software application running on the portable electronic device, or alternatively (for example in a Bluetooth implementation) via functionality built in to the operating system of the portable electronic device. In some embodiments, pairing is accomplished automatically by placing the portable electronic device near a sensor or sensor assembly. In such embodiments, the portable electronic device and the sensor or sensor assembly are both equipped with a communicative identification mechanism, for example NFC or RFID. The portable electronic device will recognize the sensor or sensor assembly when placed in close proximity to it, and will pair with the sensor or sensor assembly accordingly. In some embodiments, this automated pairing may be accomplished via other means, for example by scanning a quick response (QR) code or other visual pattern with a camera on the portable electronic device, or for example by manually entering a serial number on the portable electronic device.

In some embodiments, a sensor assembly or controller in an individual room or zone may be simultaneously or asynchronously controllable by more than one user via more than one portable electronic device. For example, a first user may connect a first portable electronic device to a sensor assembly, then a second user may connect a second portable electronic device to the same sensor assembly. The first user may then manipulate one or more settings via a graphical user interface (GUI) on the first portable electronic device. Any changes made to those settings, or resulting changes to sensor measurements, would then be reflected on a GUI on the second portable electronic device. Both the first user and the second user may thus control settings in the system from their portable electronic devices. In some such embodiments one user is a primary user and another user is a secondary user, and the secondary user requires permission from the first user in order to change some or all settings. In other embodiments, multiple or all users of the system may change all settings without permission from any other user. In some embodiments, certain settings may be locked by a central control system during certain times of the year or certain times of the day.

Figure 2:
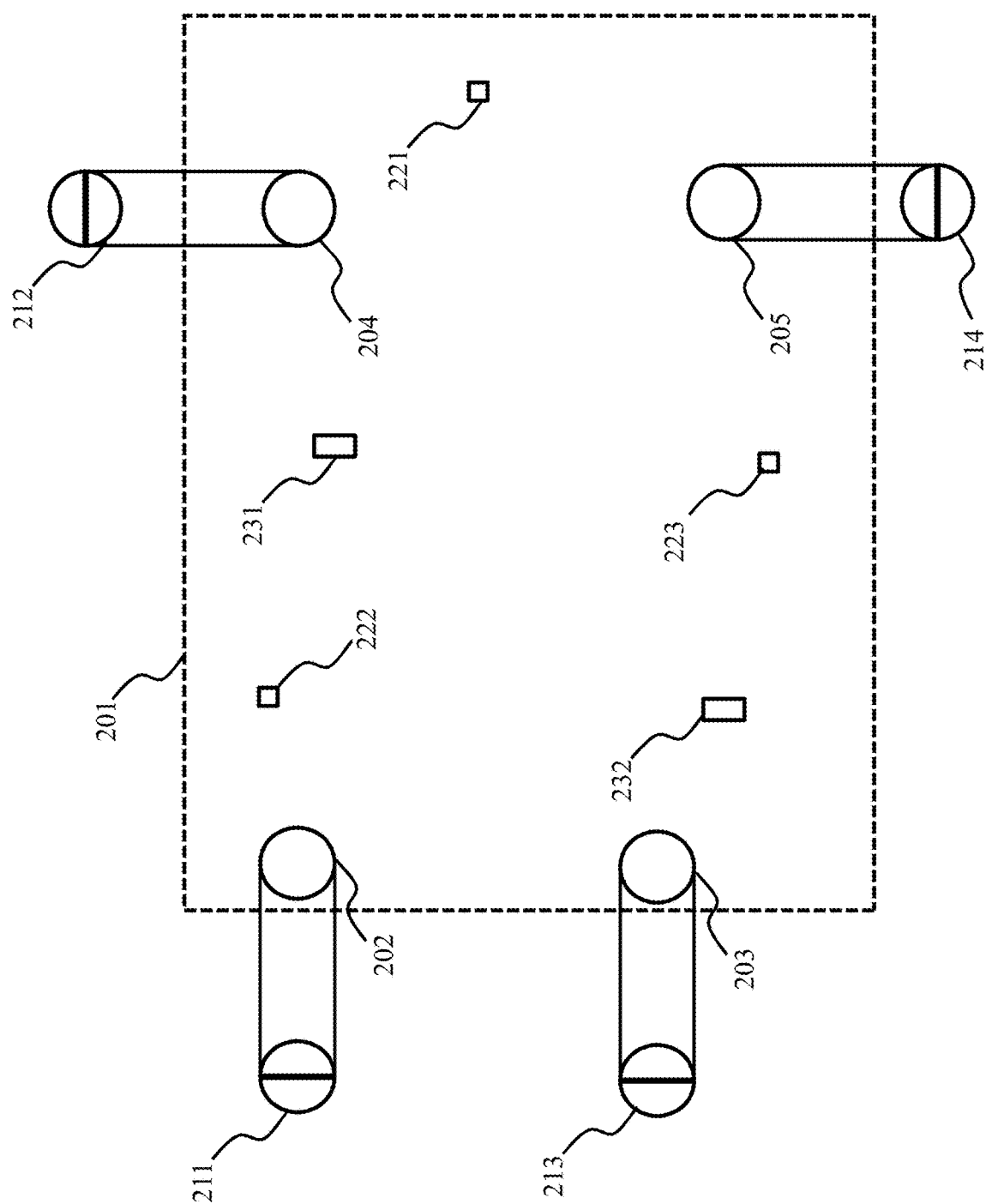
FIG. 2 is a schematic of a system of the present invention.

Referring now to FIG. 2, an exemplary embodiment of a system of the present invention implemented in a larger open room 201 is shown. In the depicted embodiment, the room 201 has four air vents 202, 203, 204, and 205, which may each be for example an air inlet or outlet. Each air vent in the depicted embodiment is fluidly connected to a controllable duct (211, 212, 213, and 214 respectively), each duct having a damper. In some embodiments, some or all of the controllable ducts are controlled together, while in other embodiments each of the ducts is controlled independently. In some implementations, one or more sensors 221, 222, and 223 may be positioned in different parts of the room. Sensors may be distributed roughly evenly throughout the room or may alternatively be arranged based on prevailing air flow, typical distribution of occupants, or any other alternative arrangement. Sensors of the present invention may comprise temperature sensors, humidity sensors, and/or positioning elements to monitor the positions of one or more individuals within the room, for example using near-field communication (NFC) or Bluetooth Beacon equipped smartphones. For example, each of the sensors 221, 222, 223 may also contain a Bluetooth Beacon transceiver, and the smartphones 231 and 232 may be configured to Also shown in the depicted example are two portable electronic devices 231 and 232 which may be held by two people in the room. The two portable electronic devices may in some embodiments be smartphones, and may contain one or more sensors and communication devices for use in a system of the present invention. In the depicted embodiment, a controller of the present invention receives measurements from some or all of the sensors and/or smartphones, and controls the ducts 211, 212, 213, and 214 in order to achieve optimal airflow in the room 201. An exemplary system may also control one or more ducts based on the locations and preferences of individuals within the room. For example, if the HVAC system is set to cooling, and the user of smartphone 232 prefers colder temperatures, a controller of the present invention may open duct 213 even if the temperature in the room 201 as a whole is at an otherwise acceptable level, in order to lower the temperature in the area around smartphone 232. Similarly, if the user of smartphone 231 prefers a warmer temperature, a controller of the present invention may close duct 212 even if the room 201 requires cooling to a lower temperature, in order to meet the preferences of the user of smartphone 231. As the users of smartphones 231 and 232 move about room 201, their approximate location can be tracked by a controller communicating with the various sensors and smartphones. The controller may the adjust the ducts accordingly in order to deliver appropriate airflow to different regions of room 201.

The distributed sensors 221, 222, and 223 may also act as a feedback mechanism for a machine learning system of the present invention. If a controller knows the approximate location of all the sensors and ducts in the room, and is configured to measure temperatures over time, the controller would be able to characterize the airflow in the room and operate more efficiently.

In some embodiments, sensors or sensor assemblies of the invention further include one or more control elements, for example buttons, dials, switches, or touchscreens. In some embodiments, controls included in a sensor or sensor assembly may include a temperature control, a system on/off control, a manual open/close control for one or more ducts or smart ducts, a switch for automatic/manual mode, controls for allowing or removing one or more portable electronic devices from being able to issue commands to the system, or the like.

Figure 3:
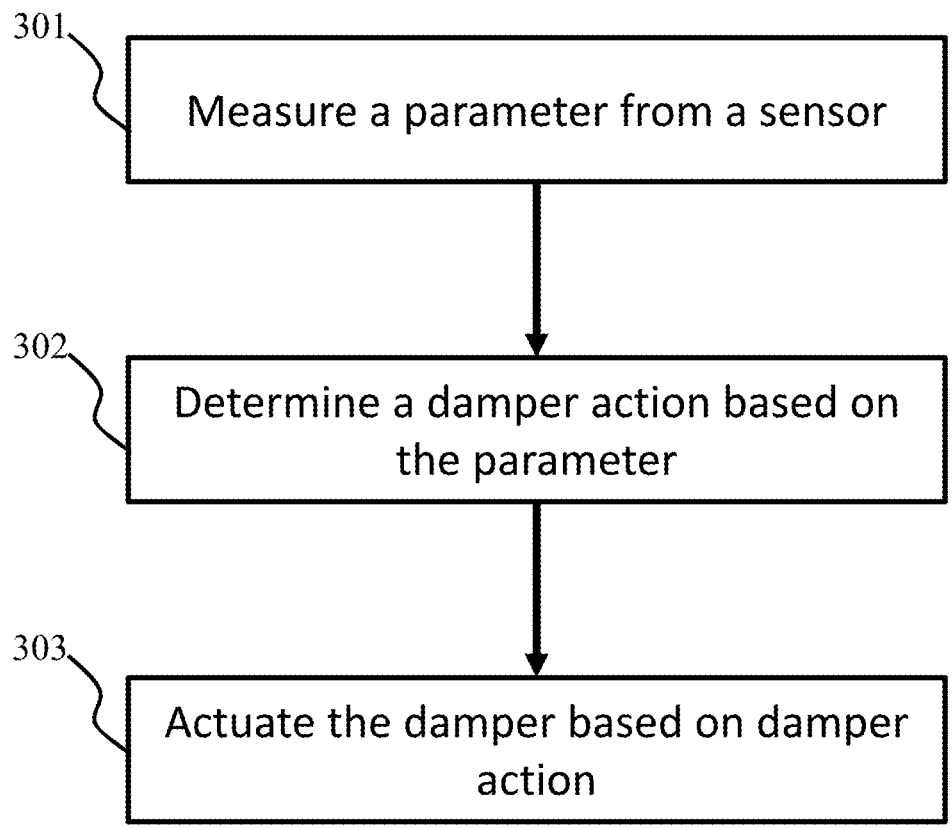
FIG. 3 is a diagram of a method of the present invention.

Referring now to FIG. 3, a method of the present invention is shown. The exemplary method of controlling a damper in a duct fluidly connected to a room includes step 301, measuring at least one parameter from at least one sensor positioned in the room; step 302, determining a damper action based on the at least one parameter; and step 303, actuating the damper in accordance with the determined damper action.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A system for controlling airflow into a single room, comprising:
   a duct having a controllable damper, fluidly connected to the room, the damper positioned in the duct outside the room, along an airflow path connected to the room;
   a controller connected to the damper, configured to open and close the damper;
   at least one sensor communicatively connected to the controller, positioned in the room and configured to measure a parameter in the room;
   at least one portable computing device communicatively connected to the sensor and the controller; and
   control logic stored as instructions on a non-transitory computer readable medium, the instructions configured to open and close the damper in response to a measurement received from the at least one sensor.

2. The system of claim 1, wherein the at least one sensor comprises a sensor selected from the group consisting of a temperature sensor and a motion sensor.

3. The system of claim 1, wherein the at least one sensor is disposed within an object selected from the group consisting of a light fixture, a smoke detector, a ceiling tile, and a wall plate cover.

4. The system of claim 1, wherein the portable computing device is a smartphone.

5. The system of claim 4, wherein the non-transitory computer-readable medium containing the control logic is disposed within the smartphone.

6. The system of claim 5, wherein the control logic comprises an interface for manual control of the damper.

7. The system of claim 4, wherein the smartphone is configured to pair with the at least one sensor when placed near the at least one sensor.

8. The system of claim 4, wherein the at least one sensor comprises one sensor electrically connected to the smartphone.

9. The system of claim 1, wherein the at least one portable computing device comprises two portable computing devices.

10. The system of claim 1, wherein the at least one sensor and the non-transitory computer-readable medium containing the control logic are disposed within a sensor assembly.

11. The system of claim 10, wherein the sensor assembly further comprises at least one control element selected from the group consisting of a button, dial, switch, and touchscreen.

12. A method of controlling a damper in a duct fluidly connected to a room, comprising:
   providing a damper in a duct, the damper positioned outside a room upstream from a vent positioned in the room;
   measuring at least one parameter from at least one sensor positioned in the room;
   communicating the measurement of the at least one parameter to a central controller;
   determining a damper action with the central controller based on the at least one parameter;
   communicating the damper action from the central controller to the damper; and
   actuating the damper in accordance with the determined damper action.

13. The method of claim 12, wherein the at least one sensor is selected from the group consisting of a sound sensor, a range sensor, and an RF sensor.

14. The method of claim 12, further comprising the steps of:
   receiving an instruction from a user via a portable electronic device; and
   modifying the damper action based on the instruction from the user.

15. The method of claim 14, wherein the portable electronic device is a smartphone.

16. The method of claim 15, wherein the at least one sensor is electrically connected to the smartphone.

17. The method of claim 14, wherein the instruction is an instruction to open or close the damper.

18. The method of claim 12, wherein the at least one sensor is a temperature sensor, the at least one parameter is a temperature measurement, and the method further comprises the step of comparing the temperature measurement to a temperature threshold.

19. The system of claim 1, wherein the non-transitory computer-readable medium is connected to a central controller executed in a cloud instance remote from the room.

* * * * *